(12) United States Patent
Kolekar et al.

(10) Patent No.: US 9,521,648 B1
(45) Date of Patent: Dec. 13, 2016

(54) LOCATION ESTIMATION AND WIRELESS DISPLAY DEVICE CONNECTION METHOD AND DEVICE

(71) Applicant: Intel Corporation, Santa Clara, CA (US)

(72) Inventors: Abhijeet Kolekar, Hillsboro, OR (US); Evan A. Edstrom, Spokane, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,302

(22) Filed: Jun. 26, 2015

(51) Int. Cl.
| | |
|---|---|
| *H04W 24/00* | (2009.01) |
| *H04W 64/00* | (2009.01) |
| *H04W 48/16* | (2009.01) |
| *H04W 76/02* | (2009.01) |
| *H04W 24/02* | (2009.01) |
| *H04W 88/08* | (2009.01) |
| *H04W 84/12* | (2009.01) |

(52) U.S. Cl.
CPC ........... *H04W 64/003* (2013.01); *H04W 24/02* (2013.01); *H04W 48/16* (2013.01); *H04W 76/023* (2013.01); *H04W 84/12* (2013.01); *H04W 88/08* (2013.01)

(58) Field of Classification Search
CPC .............................. H04W 64/00; G01S 5/0252
USPC ............................................ 455/422.1, 456.1
See application file for complete search history.

(56) References Cited

U.S. PATENT DOCUMENTS

| | | | | |
|---|---|---|---|---|
| 2005/0146433 | A1* | 7/2005 | Waltermann ............ | G01S 15/74 340/553 |
| 2012/0046025 | A1* | 2/2012 | Das ....................... | H04W 48/08 455/422.1 |
| 2012/0200457 | A1* | 8/2012 | Farrokhi ................ | G01S 5/0036 342/357.29 |
| 2013/0023284 | A1* | 1/2013 | Stanger .............. | G06Q 30/0259 455/456.1 |

(Continued)

FOREIGN PATENT DOCUMENTS

GB          2484115 A          4/2012

OTHER PUBLICATIONS

European Communication dated Oct. 12, 2016 with Search Report for European Patent No. 16170879.7.

*Primary Examiner* — Thomas Lett
(74) *Attorney, Agent, or Firm* — Schiff Hardin LLP

(57) ABSTRACT

A location estimation method and a communication device configured to estimate location and automatically connect to one or more wireless display devices based on the determined location. The estimation of location can be based on one or more location signatures that include information of the wireless display device(s). The location estimation method can include identifying available access points (APs) and wireless display adapters, determining wireless characteristics of the available APs and wireless display adapters, calculating match scores based on the wireless characteristics of the available APs and the wireless characteristics of the available wireless display adapters, determining a location signature based on the determined match scores, and determining a location based on the location signature. The communication device can be configured to automatically connect to the wireless display device(s). The communication device can operate in a standby display mode upon the connection.

23 Claims, 6 Drawing Sheets

(56) References Cited

U.S. PATENT DOCUMENTS

| | | | |
|---|---|---|---|
| 2013/0332639 A1* | 12/2013 | Jiang | G06F 13/4022 |
| | | | 710/300 |
| 2014/0179341 A1 | 6/2014 | Sydir et al. | |
| 2014/0194139 A1* | 7/2014 | Yang | G01S 5/0252 |
| | | | 455/456.1 |
| 2014/0232618 A1* | 8/2014 | Perrin | G06F 3/14 |
| | | | 345/2.3 |
| 2015/0031404 A1* | 1/2015 | Yada | H04W 76/045 |
| | | | 455/508 |
| 2015/0220296 A1* | 8/2015 | Lin | H04M 3/567 |
| | | | 345/2.3 |

\* cited by examiner

LOCATION ESTIMATION AND WIRELESS DISPLAY DEVICE CONNECTION METHOD AND DEVICE

BACKGROUND

Field

Aspects described herein generally relate to wireless display devices and wireless display methods, including processes for pairing wireless display source devices with wireless display sink devices.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
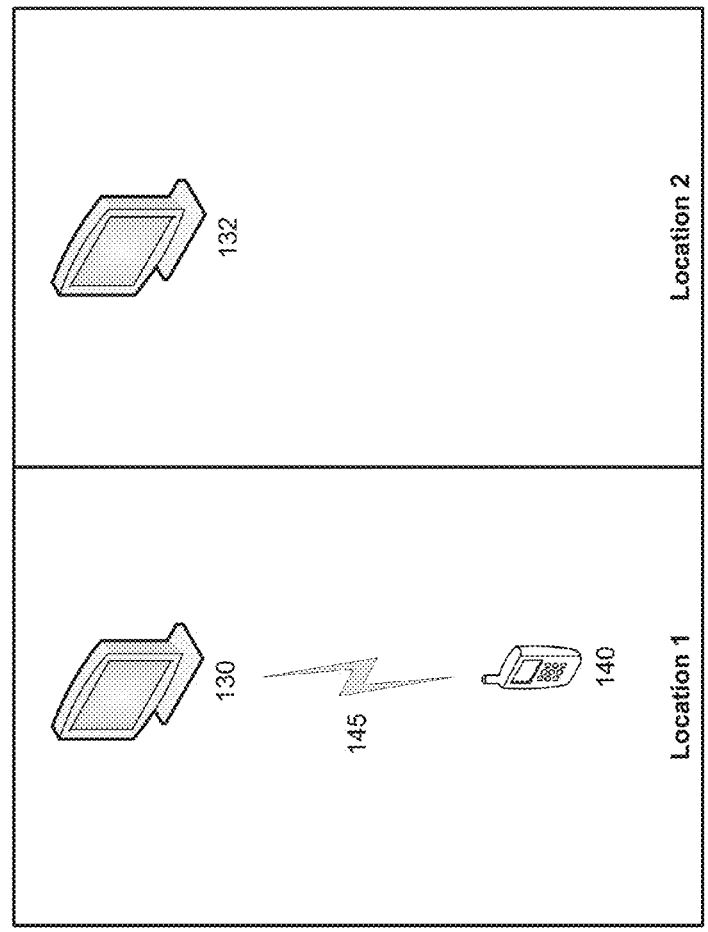
FIG. 1 illustrates a wireless display environment according to an exemplary aspect of the present disclosure.
Figure 1:

FIG. 1 illustrates an example wireless display environment 100 according to an exemplary aspect of the present disclosure. The wireless display environment 100 can include a wireless access point (AP) 120, one or more mobile devices 140, and wireless display sink devices 130 and 132. For the purpose of this discussion, wireless display sink devices can be referred to as "adapters."

In an exemplary aspect, the wireless display environment 100 can support one or more wireless communication protocols using the AP 120, including, for example, one or more industrial, scientific and medical (ISM) radio bands. For example, the AP 120 can be configured to support one or more wireless communication protocols, including one or more wireless local access networks (WLAN) conforming to Institute of Electrical and Electronics Engineers' (IEEE) 802.11 Wi-Fi specification. In this example, AP 120 can be referred to as WLAN AP 120 (e.g., the AP 120 is a WLAN access point).

The AP 120 is not limited to these exemplary communication protocols, and the AP 120 can support one or more other protocols in addition to (or in the alternative to) IEEE's 802.11 Wi-Fi specification as would be understood by one of ordinary skill in the relevant arts. Further, the number of APs 120, mobile devices 140, and/or adapters 130/132 are not limited to the exemplary quantities illustrated in FIG. 1, and the wireless display environment 100 can include any number of the various components as would be understood by one of ordinary skill in the relevant art(s).

In an exemplary aspect, the AP 120, mobile device 140, and/or adapters 130 and/or 132 can include processor circuitry that is configured to process communications via one or more wireless technologies. The mobile device 140, the AP 120, and adapters 130/132 can each include one or more transceivers configured to transmit and/or receive wireless communications via one or more wireless technologies within the wireless display environment 100. For example, the mobile device 140 can be configured to wirelessly communicate with the AP 120 via WLAN communications and, for example, adapter 130 via one or more wireless display protocols. The adapters 130 and/or 132 can be configured to wireless communicate with the AP 120 via WLAN communications and support one or more peer-to-peer (direct) wireless display connections with one or more devices, such as mobile device 140.

In operation, the mobile device 140 can be configured to communicate with the AP 120 via one or more downlink (DL) channels and one or more uplink (UL) channels. The mobile device 140 can be configured to wirelessly communicate with the AP 120 using IEEE's 802.11 Wi-Fi specification. The mobile device 140 can also be configured to wirelessly transmit content (e.g., video, audio, and/or still images) to one or more devices (e.g., adapters 130/132) for wireless display on the destination device(s). In this example, the mobile device 140 can be configured to wirelessly display content (e.g., video, audio, and/or still images) on one or more of the adapters 130/132 using a peer-to-peer wireless display connection 145. The wireless display connection 145 can be a direct connection between the mobile device 140 and one or more of the adapters 130/132. The direct wireless display connection 145 can also be referred to as a Wi-Fi Direct connection, a Wi-Fi Peer-to-Peer (P2P) connection, a WiDi (Wireless Display) connection, a Miracast connection, or the like.

In an exemplary aspect, the mobile device 140 can be configured to "cast" to one or more adapters (e.g., 130/132). For the purpose of this discussion, a "casting" operation includes a source device (e.g., mobile device 140) initiating and establishing a wireless display connection (e.g., peer-to-peer wireless display connection 145) with one or more adapters (e.g., devices 130/132) without transmitting content to the adapter(s). That is, when a source device "casts" to a sink device, the source device establishes a wireless display connection with the sink device but remains in a standby display mode (e.g., does not display content to the sink device) until a wireless display operation is initiated.

The adapters 130 and/or 132 can be configured to support one or more peer-to-peer (direct) wireless display connections 145 established with one or more display sources devices, such as mobile device 140. The adapters 130 and/or 132 can also be configured to wirelessly communicate with the AP 120 using IEEE's 802.11 Wi-Fi specification. In some examples, an indirect wireless display connection can be established with one or more devices (e.g., mobile device 140) via the AP 120.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In one or more aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal, and/or a smart device/appliance—such as, for example, smart lighting device, smart door lock, smart home security system, smart refrigerator, etc.

Examples of the adapters 130 and/or 132 include (but are not limited to) televisions, displays, projectors, multimedia systems, speakers, or one or more other mobile devices (e.g., other mobile devices 140).

As illustrated in FIG. 1, the mobile device 140 and the adapter 130 can be located in Location 1, while adapter 132 can be located in Location 2. Locations 1 and 2 can be located such that the mobile device 140 is within wireless display range of both the adapter 130 and adapter 132. For example, Locations 1 and 2 can be adjoining rooms within a building, etc. The mobile device 140, the adapter 130, and adapter 132 can also be within the WLAN range of AP 120. That is, the mobile device 140, adapter 130, and adapter 132 can be in wireless range of the AP 120 and configurable to establish wireless connections to the AP 120.

Figure 2:
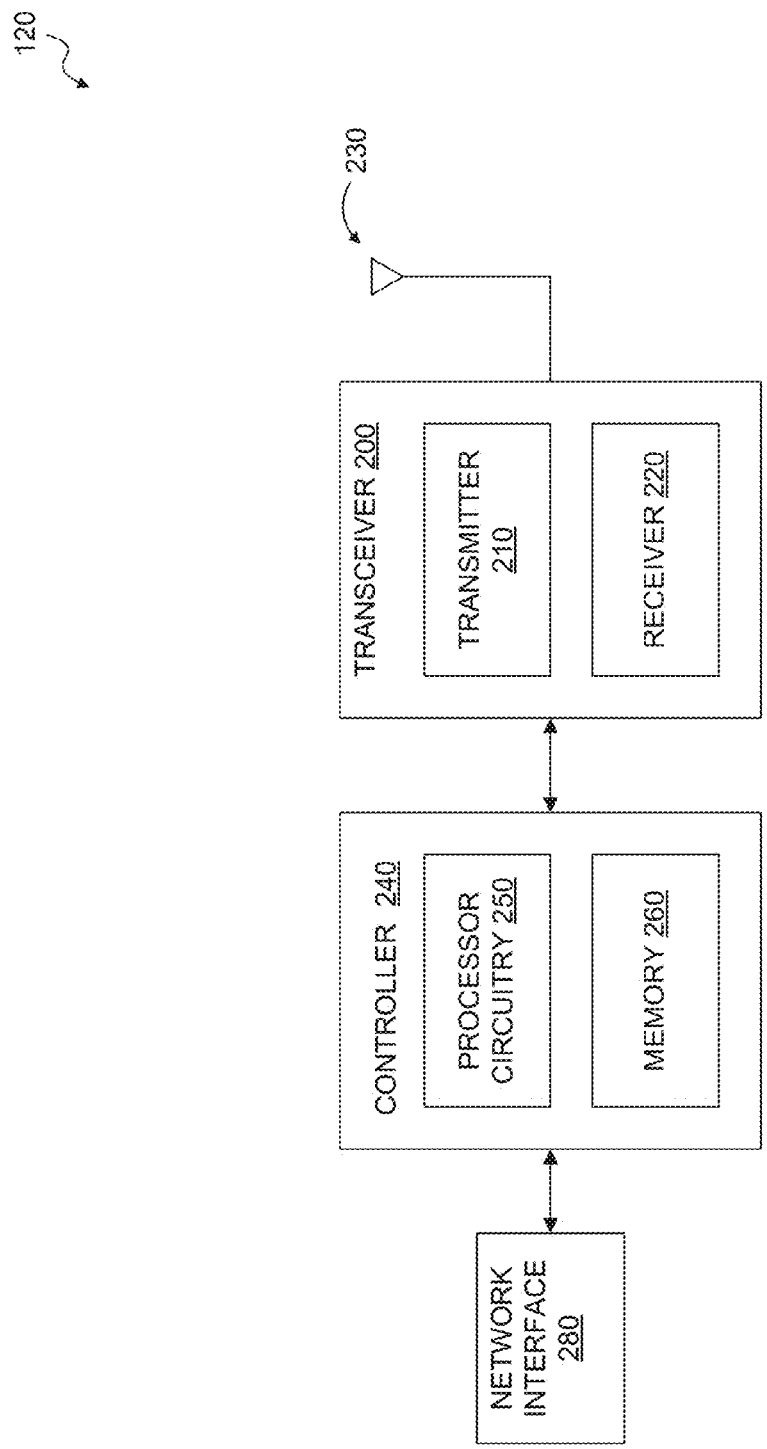
FIG. 2 illustrates an access point (AP) according to an exemplary aspect of the present disclosure.

FIG. 2 illustrates an access point (AP) according to an exemplary aspect of the present disclosure. In an exemplary aspect, the AP of FIG. 2 is an example of the AP 120 of FIG. 1. For example, the AP 120 can include a transceiver 200 and a network interface 280, each communicatively coupled to controller 240.

The AP 120 can be communicatively coupled to one or more backhaul communication networks (via the network interface 280) that can include one or more well-known communication components—such as one or more network switches, one or more network gateways, and/or one or more servers. The backhaul communication network(s) can include one or more devices and/or components configured to exchange data with one or more other devices and/or components via one or more wired and/or wireless communications protocols. In exemplary aspects, the AP 120 communicates with one or more service providers and/or one or more other APs 120 via the backhaul communication network(s).

The transceiver 200 includes processor circuitry that is configured to transmit and/or receive wireless communications via one or more wireless technologies within the wireless display environment 100. For example, the transceiver 200 can include one or more transmitters 210 and one or more receivers 220 that configured to transmit and receive wireless communications, respectively, via one or more antennas 230.

The transceiver 200 can be configured to transmit and receive WLAN communications (e.g., communications conforming to IEEE 802.11). In this example, the transceiver 200 can be referred to as WLAN transceiver 200. Those skilled in the relevant art(s) will understand that the transceiver 200 is not limited to WLAN communications, and can be configured for communications that conform to one or more other protocols in addition (or in the alternative) to the WLAN communications.

Those skilled in the relevant art(s) will recognize that the transceiver 200 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the AP 120 can be configured for wireless communication utilizing a Multiple-input Multiple-output (MIMO) configuration.

The network interface 280 includes processor circuitry that is configured to transmit and/or receive communications via one or more wired technologies to/from the backhaul communication networks 105 and/or 107. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the AP 120, and/or one or more components of the AP 120. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.).

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
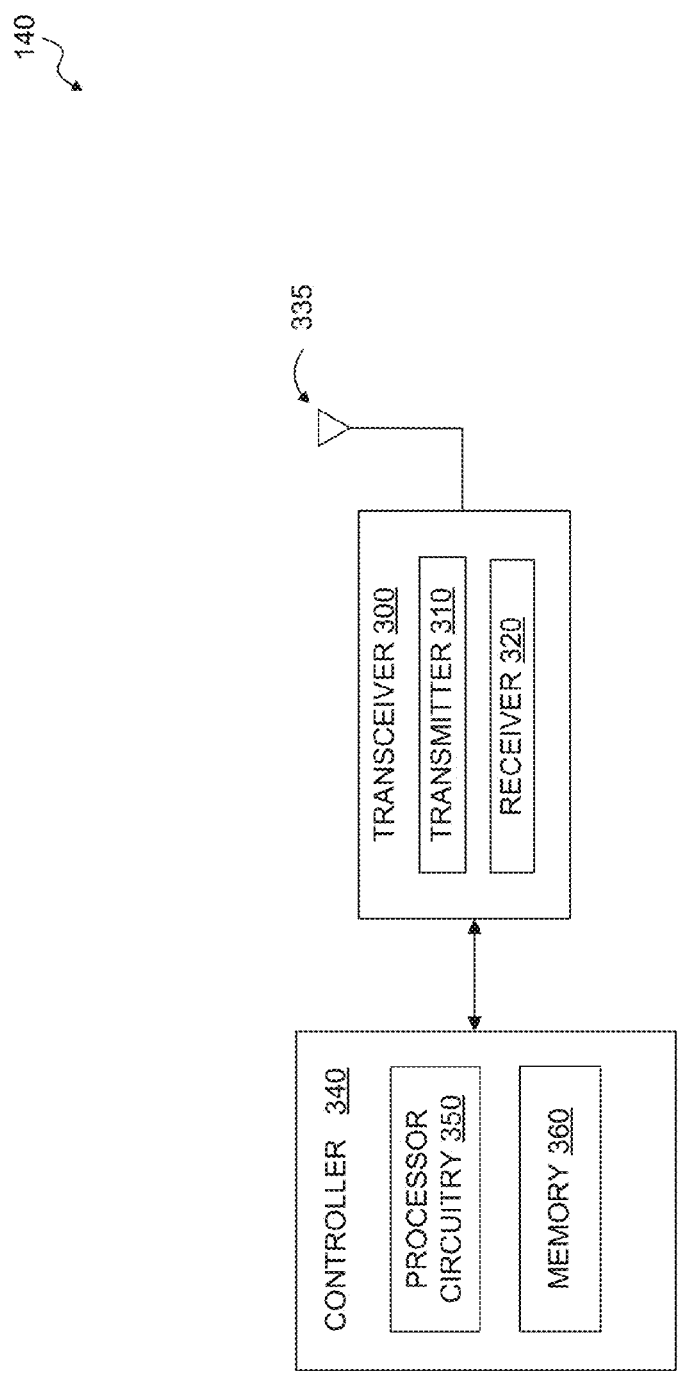
FIG. 3 illustrates a mobile device according to an exemplary aspect of the present disclosure.

FIG. 3 illustrates a mobile device according to an exemplary aspect of the present disclosure. In an exemplary aspect, the mobile device of FIG. 3 is an example of the mobile device 140 of FIG. 1. The mobile device 140 can include controller 340 communicatively coupled to transceiver 300 that is configured to transmit and/or receive wireless communications via one or more wireless technologies within the wireless display environment 100 (e.g., WLAN and/or wireless display communications).

The transceiver 300 can include processor circuitry that is configured for transmitting and/or receiving wireless communications conforming to one or more wireless protocols. For example, the transceiver 300 can include a transmitter 310 and receiver 320 that are configured for transmitting and receiving WLAN and/or wireless display communications, respectively, via one or more antennas 335. Those skilled in the relevant art(s) will understand that the transceiver 300 is not limited to WLAN and wireless display communications, and can be configured for communications that conform to one or more other protocols in addition (or in the alternative) to these communications. Further, in one or more exemplary aspects, the mobile device 140 can include one or more additional transceivers configured for transmitting and/or receiving wireless communications conforming to one or more other wireless protocols (e.g., NFC, Bluetooth, LTE, GSM, etc.).

In exemplary aspects, the transceiver 300 can include (but are not limited to) a digital signal processor (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuitry 350 that is configured to control the overall operation of the mobile device 140, such as the operation of the transceiver 300—including, for example, transmitting and/or receiving of wireless communications via the transceivers 300 and/or 330, performing one or more baseband processing functions (e.g., media access control (MAC), encoding/decoding, modulation/demodulation, data symbol mapping, error correction, etc.); performing one or more interference estimations; the running of one or more applications and/or operating systems; power management (e.g., battery control and monitoring); display settings; volume control; and/or user interactions via one or more user interfaces (e.g., keyboard, touchscreen display, microphone, speaker, etc.).

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

In an exemplary aspect, the processor circuitry 350 can be configured to perform location determinations of the mobile device 140 based on radio frequency (RF) characteristics associated with one or more access points (e.g., AP 120). For example, the mobile device 140 can estimate its location based on signal strength values received from one or more APs and/or adapters.

The processor circuitry 350 can also be configured to generate one or more location signatures associated with a corresponding location that includes information about one or more APs at the location. For example, a location signature can include characteristics of the APs in the location. In an exemplary aspect, the location signatures can include (but are not limited to) SSID (service set identifier), BSSID (basic service set identifier), received signal strength indication (RSSI) value, quality of service (QoS) value, frequency value, and/or one or more other characteristics as would be understood by one of ordinary skill in the relevant arts. In this example, the location signature will include one or more of these characteristics for each AP included in the location signature. In an exemplary aspect, the location signature can also include geo-location information that identifies geographical coordinates of the location.

For the purpose of this disclosure, the BSSID and SSID are identifiers used to identify the basic service set (e.g., an access point). For example, BSSID uniquely identifies the basic service set (BSS) and is a media access control (MAC) address of the wireless access point. The SSID is, for example, a 1 to 32 byte string and is typically a human-readable string commonly called the "network name." The RSSI value is a measurement of the power present in a received radio signal. The QoS value indicates the network and/or link quality of the corresponding wireless network, including error rates, bandwidth, throughput, transmission delay, availability, jitter, etc. The frequency value identifies the frequency band (e.g., WLAN channel) of the wireless network.

In an exemplary aspect, the location signature(s) can also include characteristics associated with one or more adapters at a corresponding location. For example, the location signature(s) can include (but are not limited to), for example, SSIDs of the adapters, device name, BSSIDs of adapters, RSSI values of adapters, QoS values of adapters, frequency values of adapters, and/or one or more other characteristics of adapters as would be understood by one of ordinary skill in the relevant arts.

For example, as illustrated in FIG. 1, the mobile device 140 at Location 1 is in the proximity (e.g., range) of adapters 130 and the adapter 132. The location signature generated for this location with respect to AP 120 can include characteristics associated with the adapters 130 and/or 132 as described above. In this example, the mobile device 140 is in closer proximity to adapter 130 than adapter 132. This proximity can be reflected in the characteristics included in the location signature generated for the corresponding location.

The mobile device 140 can be configured to store the generated location signatures in a location signature database embodied in memory 360 of the mobile device 140 and/or in an external database (e.g., a server).

In an exemplary aspect, the mobile device 140 can be configured to analyze characteristics of one or more APs and/or adapters that are in the proximity (range) of the current location of the mobile device 140 (e.g., within range of the mobile device 140). In operation, the mobile device 140 can perform one or more wireless scans to measure characteristics of one or more APs and/or adapters. In this example, a wireless scan can include a scan of both APs and adapters. In other examples, separate wireless scans can be performed: an AP wireless scan and a sink device scan.

The processor circuitry 350 can compare the analyzed characteristics to one or more previously stored location signatures to identify one or more available adapters in proximity to the mobile device's 140 current location. In an exemplary aspect, the previously stored location signature(s) can include one or more adapters that have previously been identified as a preferred adapters by the mobile device 140.

In operation, the mobile device 140 can be configured to automatically connect to an available adapter based on the location signatures and the analyzed characteristics of the APs and adapters. For example, with reference to FIG. 1, when the mobile device 140 arrives at Location 1, the mobile device 140 can be configured to initiate one or more wireless scans to identify the APs and adapters that are in the proximity of the mobile device 140. The mobile device 140 can then analyze the characteristics of the detected APs and adapters, and compare the characteristics to the one or more previously generated and stored location signatures. Based on the comparison, the mobile device 140 can identify a adapter to connect to, and automatically establish a connection to the adapter. In this example, the automatic connection can be performed in the background and without user involvement. In an exemplary aspect, the automatically established connection is in response to a casting operation performed by the mobile device 140. In this example, the mobile device 140 can be configured to establish a wireless display connection to the adapter and await a wireless display operation that initiates a display of content on the adapter. That is, the mobile device 140 can connect to the wireless display device and enter a display standby mode until a display operation is performed. As a result, the connected adapter will be available to the user of the mobile device 140 for wireless display operations when such operations are desired. In this example, the wireless display of content can be performed without connection-establishment delays of a manual connection establishment procedure—opening a system application, performing a scan, and selecting a device to connect to.

Figure 4:
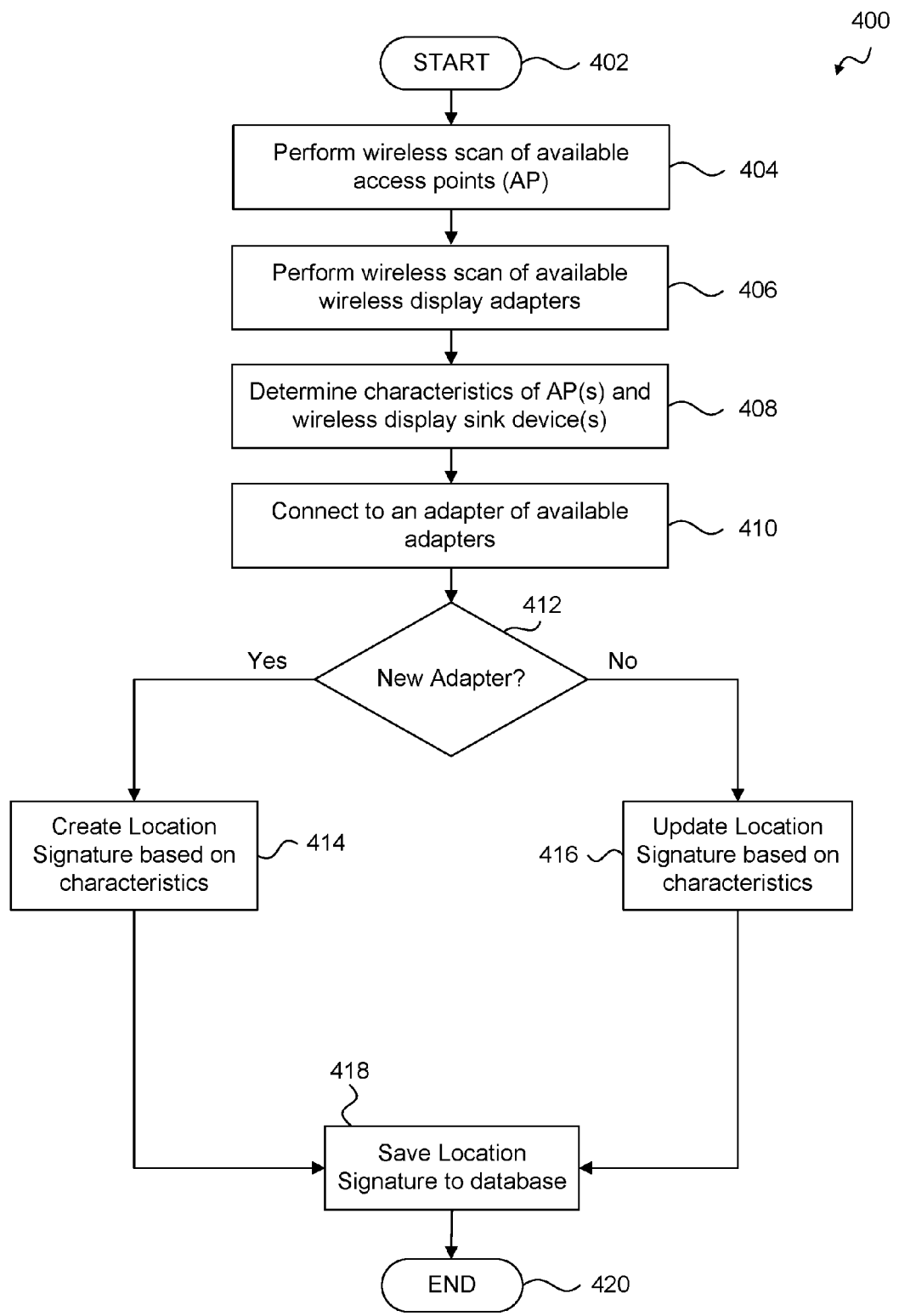
FIG. 4 illustrates a location signature generation method according to an exemplary aspect of the present disclosure.

FIG. 4 illustrates a flowchart of location signature generation method 400 according to an exemplary aspect of the present disclosure. The flowchart is described with continued reference to FIGS. 1-3. The steps of the method are not limited to the order described below, and the various steps may be performed in a different order. Further, two or more steps of the method may be performed simultaneously with each other.

The method of flowchart 400 begins at step 402 and transitions to step 404, where a scan for available APs is performed. In an exemplary aspect, the processor circuitry 350 can be configured to control the transceiver 300 to scan for available APs in the proximity of the mobile device 140.

After step 404, the flowchart 400 transitions to step 406, where a scan for available adapters is performed. In an exemplary aspect, the processor circuitry 350 can be configured to control the transceiver 300 to scan for available adapters in the proximity of the mobile device 140.

After step 406, the flowchart 400 transitions to step 408, where characteristics of the discovered APs and/or adapters are determined/measured. In an exemplary aspect, the processor circuitry 350 can control the transceiver 300 to request information from the APs and/or adapters, including, for example BSSIDs and/or SSIDs. The processor circuitry 350 can analyze one or more wireless signals received from the APs and/or adapters to determine (e.g., calculate), for example, RSSI values, QoS values, and/or frequency values associated with the APs and/or adapters.

After step 408, the flowchart 400 transitions to step 410, where the mobile device 140 connects to an adapter of the available adapters. For example, the mobile device 140 (e.g., processor circuitry 350) can be configured to control the mobile device 140 to connect to an adapter in response to a user selection.

After step 410, the flowchart 400 transitions to step 412, where it is determined if the connected adapter is a new adapter or a previously used adapter. In an exemplary aspect, the processor circuitry 350 can be configured to compare one or more characteristics of the adapter to characteristic (e.g., BSSID, SSID, device name, etc.) included in one or more stored location signatures. The location signature(s) can be retrieved from a location signature database in, for example, memory 360 and/or in an external memory/server. Based on this comparison, the processor circuitry 350 can determine if the adapter is a new or previously used adapter. For example, if one or more characteristics match characteristics included in a location signature, the processor circuitry 350 can determine that the adapter has been previously used (NO at step 412), and the flowchart 400 transitions to step 416. If the characteristics do not match characteristics included in a location signature, the processor circuitry 350 can determine that the adapter is new (YES at step 412), and the flowchart 400 transitions to step 414.

At step 414, one or more location signatures are created for the new adapter. In an exemplary aspect, the processor circuitry 350 is configured to create the new location signature(s) based on wireless characteristics (e.g., BSSIDs, SSIDs, RSSI values, QoS values, and/or frequency values) associated with the adapter and/or one or more available APs After step 414, the flowchart 400 transitions to step 418, where the generated location signature can be stored in a location signature database in, for example, memory 360 and/or in an external memory/server.

At step 416, the location signature having characteristics that have been matched to the connected adapter can be updated to include the characteristics (e.g., BSSIDs, SSIDs, RSSI values, QoS values, and/or frequency values, etc.) of the connected adapter and/or characteristics of one or more of the available APs.

After step 418, the flowchart 400 transitions to step 420, where the flowchart 400 ends. The flowchart 400 may be repeated one or more times.

Figure 5A:
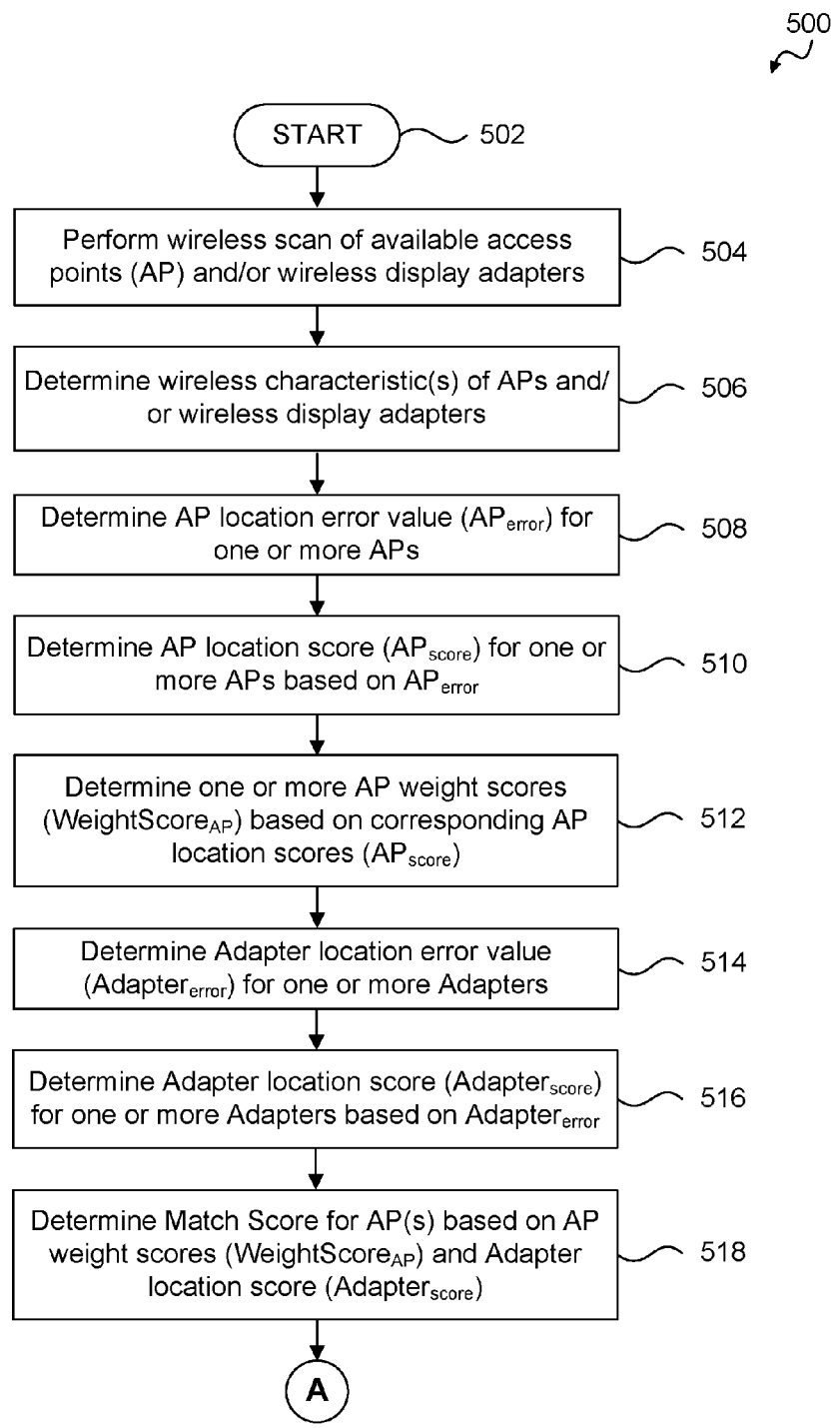
FIGS. 5A-5B illustrate a location estimation method according to an exemplary aspect of the present disclosure.
Figure 5B:
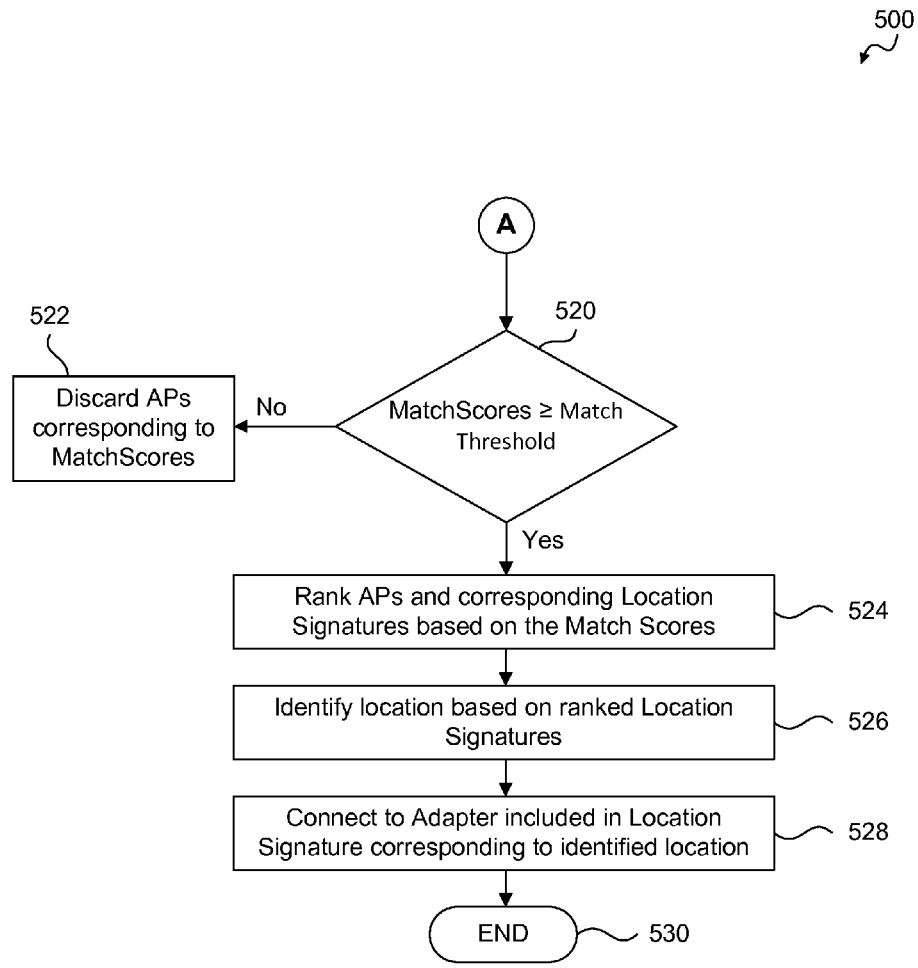

As described above, the mobile device 140 can be configured to automatically connect to an available adapter based on the location signatures and the analyzed characteristics of the APs and adapters within range of the mobile device 140. A wireless display proximity detection and connection procedure will be described with reference to FIG. 5, which illustrates a location estimation method 500 according to an exemplary aspect of the present disclosure. The flowchart is described with continued reference to FIGS. 1-4. The steps of the method are not limited to the order described below, and the various steps may be performed in a different order. Further, two or more steps of the method may be performed simultaneously with each other.

As an overview, the mobile device 140 can be configured to initiate one or more wireless scans to identify the APs and adapters that are in the proximity of the mobile device 140. The mobile device 140 can compare the detected APs and/or adapters to one or more APs and/or adapters included in one or more location signatures previously generated (e.g., location signature(s) created or updated as illustrated in FIG. 4). Based on the comparison, the mobile device 140 can identify previously used or encountered APs and/or adapters.

In operation, the mobile device 140 can analyze characteristic of the previously used or encountered APs and/or adapters. The analyzed characteristics can be compared to one or more characteristics included in one or more previously generated location signatures. Based on this comparison, the mobile device 140 can identify a adapter in proximity of the mobile device 140, and automatically establish a connection to the adapter.

The method of flowchart 500 begins at step 502 and transitions to step 504, a scan for available AP(s) and/or adapter(s) is performed. In an exemplary aspect, the processor circuitry 350 can be configured to control the transceiver 300 to scan for available APs and/or adapter(s) in the proximity of the mobile device 140.

After step 504, the flowchart transitions to step 506, where one or more wireless characteristics of the AP(s) and/or adapter(s) in proximity to the mobile device 140 are determined. In an exemplary aspect, the processor circuitry 350 of the mobile device 140 can be configured to determine the one or more wireless characteristics.

For example, the processor circuitry 350 can determine one or more wireless characteristics for previously used or encountered APs and/or adapters in proximity of the mobile device 140. In this example, the processor circuitry 350 can determine that the AP(s) and/or adapters have been used and/or encountered before if the SSID and/or BSSID of the AP(s) and/or adapter(s) match SSID and/or BSSID values in one or more location signatures associated with the mobile device 140. That is, the previously used or encountered APs and/or adapters can be identified by matching detected APs and/or adapter(s) with AP(s) and/or adapter(s) that are included in one or more location signatures.

In an exemplary aspect, the processor circuitry 350 can determine the wireless characteristics for each of the APs and adapters that are included in a location signature and are in proximity of the mobile device 140. In these examples, the procedures discussed below can be repeated until the wireless characteristics for each of these APs and Adapters have been determined.

In an exemplary aspect, the wireless characteristics for the APs can include an RSSI average delta value ($RSSI_{AvgDelta}$), a signal strength average delta value ($Strength_{AvgDelta}$), an RSSI bound value ($RSSI_{BoundExceeded}$), and a signal strength bound value ($Strength_{BoundExceeded}$).

The RSSI average delta value ($RSSI_{AvgDelta}$) is the difference of the average RSSI value of the RSSI values of all previously used or encountered APs in the proximity of the mobile device 140 and the RSSI value of a select one of the used/encountered APs. For example, if the mobile device 140 discovers 25 APs during a scan, and 10 of the 25 APs have been previously encountered/used, the mobile device 140 can calculate the average RSSI value of the 10 APs. The mobile device 140 can then calculate the differences of the average RSSI value and each of the 10 APs to calculate 10 RSSI average delta values for the corresponding 10 APs.

In an exemplary aspect, the RSSI average delta value ($RSSI_{AvgDelta}$) can be calculated based on the following Equation:

$$RSSI_{AvgDelta} = |RSSI_{Average} - RSSI_{AP}|$$

where $RSSI_{Average}$ is the average RSSI value of the previously encountered or used APs, and $RSSI_{AP}$ is the RSSI value of the corresponding AP.

The signal strength average delta value ($Strength_{AvgDelta}$) is the difference of the average signal strength value of the signal strength values of all used or encountered APs in the proximity of the mobile device 140 and the signal strength value of a select one of the used/encountered APs. For example, if the mobile device 140 discovers 25 APs during a scan, and 10 of the 25 APs have been previously encountered/used, the mobile device 140 can calculate the average signal strength value of the 10 APs. The mobile device 140 can then calculate the differences of the average signal strength value and each of the 10 APs to calculate 10 signal strength average delta values for the corresponding 10 APs.

In an exemplary aspect, the strength average delta value ($Strength_{AvgDelta}$) can be calculated based on the following Equation:

$$Strength_{AvgDelta} = |Strength_{Average} - Strength_{AP}|$$

where $Strength_{Average}$ is the average signal strength value of the previously encountered or used APs, and $Strength_{AP}$ is the signal strength value of the corresponding AP.

The RSSI bound value ($RSSI_{BoundExceeded}$) identifies if the RSSI value of an AP is within a historical range of RSSI values for the AP. For example, the mobile device 140 can be configured to store minimum and maximum RSSI values that have been previously detected for one or more APs. The mobile device 140 can be configured to compare the current RSSI value of the AP to the stored minimum and maximum RSSI values for that AP to determine if the current RSSI value is within the historical bounds of the RSSI value. In operation, if the current RSSI value is within the bounds, the RSSI bound value can be, for example, zero. If the current RSSI value is outside the bounds and below the minimum historical RSSI value, the RSSI bound value can be the difference of the current RSSI value and the minimum value. The RSSI bound value can also be the absolute value of the difference. If the current RSSI value is outside the bounds and greater than the maximum historical RSSI value, the RSSI bound value can be the difference of the current RSSI value and the maximum value. Again, the RSSI bound value can also be the absolute value of the difference.

In an exemplary aspect, the RSSI bound value ($RSSI_{BoundExceeded}$) can be calculated based on the following Equation:

$$RSSI_{BoundExceeded} = \begin{cases} 0, & RSSI_{min} < RSSI_{AP} < RSSI_{max} \\ |RSSI_{min} - RSSI_{AP}|, & RSSI_{AP} < RSSI_{min} \\ |RSSI_{AP} - RSSI_{max}|, & RSSI_{AP} > RSSI_{max} \end{cases}$$

where $RSSI_{AP}$ is the RSSI value of the corresponding AP, $RSSI_{min}$ is the minimum historical RSSI value of the corresponding AP, and $RSSI_{max}$ is the maximum historical RSSI value of the corresponding AP. In an exemplary aspect, the $RSSI_{min}$ and $RSSI_{max}$ values can be the overall minimum and maximum RSSI values, respectively, recorded by the mobile device 140 for all APs, or the $RSSI_{min}$ and $RSSI_{max}$ values can be the average minimum and maximum RSSI values, respectively, recorded by the mobile device 140 for all APs.

The signal strength bound value ($Strength_{BoundExceeded}$) identifies if the signal strength value of an AP is within a historical range of signal strength values for the AP. For example, the mobile device 140 can be configured to store minimum and maximum signal strength values that have been previously detected for one or more APs. The mobile device 140 can be configured to compare the current signal strength value of the AP to the stored minimum and maximum signal strength values for that AP to determine if the current signal strength value is within the historical bounds of the signal strength value. In operation, if the current signal strength value is within the bounds, the signal strength bound value can be, for example, zero. If the current signal strength value is outside the bounds and below the minimum historical signal strength value, the signal strength bound value can be the difference of the current signal strength value and the minimum value. The signal strength bound value can also be the absolute value of the difference. If the current signal strength value is outside the bounds and greater than the maximum historical signal strength value, the signal strength bound value can be the difference of the current signal strength value and the maximum value. Again, the signal strength bound value can also be the absolute value of the difference.

In an exemplary aspect, the signal strength bound value ($Strength_{BoundExceeded}$) can be calculated based on the following Equation:

$$Strength_{BoundExceeded} = \begin{cases} 0, & strength_{min} < Strength_{AP} < Strength_{max} \\ |Strength_{min} - Strength_{AP}|, & Strength_{AP} < Strength_{min} \\ |Strength_{AP} - Strength_{max}|, & Strength_{AP} > Strength_{max} \end{cases}$$

where $Strength_{AP}$ is the signal strength value of the corresponding AP, $Strength_{min}$ is the minimum historical signal strength value of the corresponding AP, and $Strength_{max}$ is the maximum historical signal strength value of the corresponding AP. In an exemplary aspect, the $Strength_{min}$ and $Strength_{max}$ values can be the overall minimum and maximum signal strength values, respectively, recorded by the mobile device 140 for all APs, or the $Strength_{min}$ and $Strength_{max}$ values can be the average minimum and maximum signal strength values, respectively, recorded by the mobile device 140 for all APs.

In an exemplary aspect, the processor circuitry 350 can determine the wireless characteristics for each of the APs that are included in a location signature and are in proximity of the mobile device 140. In these examples, the procedures discussed above can be repeated until the wireless characteristics for each of these APs has been determined.

In an exemplary aspect, the wireless characteristics for the adapters can similarly include an RSSI average delta value ($RSSI_{AvgDelta}$), a signal strength average delta value ($Strength_{AvgDelta}$), an RSSI bound value ($RSSI_{BoundExceeded}$), and a signal strength bound value ($Strength_{BoundExceeded}$).

For example, the RSSI average delta value ($RSSI_{AvgDelta}$) can be the difference of the average RSSI value of the RSSI values of all used or encountered adapters in the proximity of the mobile device 140 and the RSSI value of a select one of the used/encountered adapters. For example, if the mobile device 140 discovers 10 adapters during a scan, and 4 of the 10 adapters have been previously encountered/used, the mobile device 140 can calculate the average RSSI value of the four adapters. The mobile device 140 can then calculate the differences of the average RSSI value and each of the four adapters to calculate four RSSI average delta values for the corresponding four adapters.

In an exemplary aspect, the RSSI average delta value ($RSSI_{AvgDelta}$) can be calculated based on the following Equation:

$$RSSI_{AvgDelta} = |RSSI_{Average} - RSSI_{WD}|$$

where $RSSI_{Average}$ is the average RSSI value of the previously encountered or used adapters, and $RSSI_{WD}$ is the RSSI value of the corresponding adapter.

The signal strength average delta value ($Strength_{AvgDelta}$) is the difference of the average signal strength value of the signal strength values of all used or encountered adapters in the proximity of the mobile device 140 and the signal strength value of a select one of the used/encountered adapters. For example, if the mobile device 140 discovers 10 adapters during a scan, and 4 of the 10 adapters have been previously encountered/used, the mobile device 140 can calculate the average signal strength value of the four adapters. The mobile device 140 can then calculate the differences of the average signal strength value and each of the four adapters to calculate four signal strength average delta values for the corresponding four adapters.

In an exemplary aspect, the strength average delta value ($Strength_{AvgDelta}$) can be calculated based on the following Equation:

$$Strength_{AvgDelta} = |Strength_{Average} - Strength_{WD}|$$

where $Strength_{Average}$ is the average signal strength value of the previously encountered or used adapters, and $Strength_{WD}$ is the signal strength value of the corresponding adapter.

The RSSI bound value ($RSSI_{BoundExceeded}$) identifies if the RSSI value of a adapter is within a historical range of RSSI values for the adapters. For example, the mobile device 140 can be configured to store minimum and maximum RSSI values that have been previously detected for one or more adapters. The mobile device 140 can be configured to compare the current RSSI value of the adapter to the stored minimum and maximum RSSI values for that adapter to determine if the current RSSI value is within the historical bounds of the RSSI value. In operation, if the current RSSI value is within the bounds, the RSSI bound value can be, for example, zero. If the current RSSI value is outside the bounds and below the minimum historical RSSI value, the RSSI bound value can be the difference of the current RSSI value and the minimum value. The RSSI bound value can also be the absolute value of the difference. If the current RSSI value is outside the bounds and greater than the maximum historical RSSI value, the RSSI bound value can be the difference of the current RSSI value and the maximum value. Again, the RSSI bound value can also be the absolute value of the difference.

In an exemplary aspect, the RSSI bound value ($RSSI_{BoundExceeded}$) can be calculated based on the following Equation:

$$RSSI_{BoundExceeded} = \begin{cases} 0, & RSSI_{min} < RSSI_{WD} < RSSI_{max} \\ |RSSI_{min} - RSSI_{WD}|, & RSSI_{WD} < RSSI_{min} \\ |RSSI_{WD} - RSSI_{max}|, & RSSI_{WD} > RSSI_{max} \end{cases}$$

where $RSSI_{AD}$ is the RSSI value of the corresponding adapter, $RSSI_{min}$ is the minimum historical RSSI value of the corresponding adapter, and $RSSI_{max}$ is the maximum historical RSSI value of the corresponding adapter. In an exemplary aspect, the $RSSI_{min}$ and $RSSI_{max}$ values can be the overall minimum and maximum RSSI values, respectively, recorded by the mobile device 140 for all adapters, or the $RSSI_{min}$ and $RSSI_{max}$ values can be the average minimum and maximum RSSI values, respectively, recorded by the mobile device 140 for all adapters.

The signal strength bound value ($Strength_{BoundExceeded}$) identifies if the signal strength value of a adapter is within a historical range of signal strength values for the adapter. For example, the mobile device 140 can be configured to store minimum and maximum signal strength values that have been previously detected for one or more adapters. The mobile device 140 can be configured to compare the current signal strength value of the adapters to the stored minimum and maximum signal strength values for that adapter to determine if the current signal strength value is within the historical bounds of the signal strength value. In operation, if the current signal strength value is within the bounds, the signal strength bound value can be, for example, zero. If the current signal strength value is outside the bounds and below the minimum historical signal strength value, the signal strength bound value can be the difference of the current signal strength value and the minimum value. The signal strength bound value can also be the absolute value of the difference. If the current signal strength value is outside the bounds and greater than the maximum historical signal strength value, the signal strength bound value can be the difference of the current signal strength value and the maximum value. Again, the signal strength bound value can also be the absolute value of the difference.

In an exemplary aspect, the signal strength bound value ($Strength_{BoundExceeded}$) can be calculated based on the following Equation:

$$Strength_{BoundExceeded} = \begin{cases} 0, & strength_{min} < Strength_{WD} < Strength_{max} \\ |Strength_{min} - Strength_{WD}|, & Strength_{WD} < Strength_{min} \\ |Strength_{WD} - Strength_{max}|, & Strength_{WD} > Strength_{max} \end{cases}$$

where $Strength_{WD}$ is the signal strength value of the corresponding adapter, $Strength_{min}$ is the minimum historical signal strength value of the corresponding adapter, and $Strength_{max}$ is the maximum historical signal strength value of the corresponding adapter. In an exemplary aspect, the $Strength_{min}$ and $Strength_{max}$ values can be the overall minimum and maximum signal strength values, respectively, recorded by the mobile device 140 for all adapters, or the $Strength_{min}$ and $Strength_{max}$ values can be the average minimum and maximum signal strength values, respectively, recorded by the mobile device 140 for all adapters.

In an exemplary aspect, the processor circuitry 350 can determine the wireless characteristics for each of the adapters that are included in a location signature and are in proximity of the mobile device 140. In these examples, the procedures discussed above can be repeated until the wireless characteristics for each of these Adapters has been determined.

After step 506, the flowchart transitions to step 508, where one or more AP location error values for one or more previously encountered/used AP(s) are determined. In an exemplary aspect, the processor circuitry 350 of the mobile device 140 can be configured to calculate AP location error values for one or more of the APs in which wireless characteristics were determined. That is, the mobile device 140 can calculate the AP location error values for the AP(s) that were previously encountered/used by the mobile device 140. In an exemplary aspect, the processor circuitry 350 can calculate the AP location error values for each AP included in a location signature and in proximity of the mobile device 140.

In operation, the mobile device 140 can be configured to calculate the AP location error value(s) based on one or more of the AP wireless characteristics and one more AP weight factors. The AP weight factors can include, for example, an RSSI average delta weight value ($RSSI_{weight}$), a signal strength average delta weight value ($Strength_{weight}$), an RSSI bound weight value ($RSSI_{boundweight}$), a signal strength bound weight value ($Strength_{boundweight}$), and a frequency mismatch weight value ($freq_{weight}$). These weight factors can be predetermined constant values, but are not limited thereto.

In an exemplary aspect, the AP location error value ($AP_{error}$) can be calculated based on the following Equation:

$$AP_{error} = (RSSI_{AvgDelta} \times RSSI_{weight}) + (Strength_{AvgDelta} \times Strength_{weight}) + (RSSI_{BoundExceeded} \times RSSI_{boundweight}) + (Strength_{BoundExceeded} \times Strength_{boundweight})$$

where $RSSI_{AvgDelta}$ is an RSSI average delta value of a corresponding AP, $Strength_{AvgDelta}$ is a signal strength average delta value for the AP, $RSSI_{BoundExceeded}$ is a RSSI bound value for the AP, and $Strength_{BoundExceeded}$ is a signal strength bound value for the AP. $RSSI_{weight}$ is the RSSI average delta weight value, $Strength_{weight}$ is the signal strength average delta weight value, $RSSI_{boundweight}$ is the RSSI bound weight value, and $Strength_{boundweight}$ is the signal strength bound weight value.

In an exemplary aspect, if the frequency of the AP is different, the $AP_{error}$ can be further calculated based on the frequency mismatch weight value ($freq_{weight}$). In this example, if the AP has the same SSID and BSSID as those stored in the location signature while having a different frequency, the $AP_{error}$ can be further calculated based on the frequency mismatch weight value ($freq_{weight}$).

In an exemplary aspect where there is a frequency mismatch, the $AP_{error}$ can be further calculated based on the following Equation:

$$AP_{error} = AP_{error} \times freq_{weight}$$

After step 508, the flowchart transitions to step 510, where a location score ($AP_{score}$) for the AP is calculated based on the AP location error value ($AP_{error}$). In an exemplary aspect, the processor circuitry 350 can be configured to calculate the location score ($AP_{score}$) based on the AP location error value ($AP_{error}$) and predetermined max score value (e.g., 100). For example, if the calculated AP location error value ($AP_{error}$) has a value of 0.6, the location score ($AP_{score}$) would be 100−0.6=99.94.

In an exemplary aspect, the location score ($AP_{score}$) can be calculated based on the following Equation:

$$AP_{score} = Score_{max} - AP_{error}$$

where $AP_{error}$ is the AP location error value and $Score_{max}$ is a predetermined maximum score value (e.g., 100).

In exemplary aspects where there is a frequency mismatch (e.g., the AP has a different frequency than that indicated in the location signature), the location score ($AP_{score}$) can be calculated based on the following Equation:

$$AP_{score} = Score_{max} - (AP_{error} \times freq_{weight})$$

After step 510, the flowchart transitions to step 512, where an AP weight score ($WeightScore_{AP}$) can be calculated. In an exemplary aspect, the processor circuitry 250 can be configured to calculate the AP weight score based on the location score ($AP_{score}$) for each of the APs that have been previously used or encountered (e.g., the APs that are in the range of the mobile device 140 and include an entry in one or more location signatures). For the purpose of this discussion, the APs that include an entry in one or more location signatures can be referred to as a matching AP.

For example, the processor circuitry 350 can be configured to calculate the location score ($AP_{score}$) for each of the matching APs. The processor circuitry 350 can then calculate the average location score ($AP_{avgscore}$) of the matching APs. For example, the processor circuitry 350 can sum the location score ($AP_{score}$) of the matching APs and divide the summed total by the number of matching APs.

The average location score ($AP_{avgscore}$) value can then be multiplied by a predetermined AP weight value to calculate the AP weight score ($WeightScore_{AP}$). The AP weight value can be a constant value (e.g., 0.75) but is not limited thereto.

In an exemplary aspect, the AP weight score ($WeightScore_{AP}$) can be calculated based on the following Equation:

$$WeightScore_{AP} = AP_{avgscore} \times AP_{weight}$$

where $AP_{weight}$ is a predetermined AP weight value, and the $AP_{avgscore}$ is the average location score of the matching APs. the AP location error value and $Score_{max}$ is a predetermined maximum score value (e.g., 100).

After step 512, the flowchart transitions to step 514, where one or more adapter location error values for one or more previously encountered/used adapters are calculated. The Adapter location error values can be similar to the AP location error values discussed above.

In an exemplary aspect, the processor circuitry 350 of the mobile device 140 can be configured to calculate Adapter location error values for one or more of the adapters in which wireless characteristics were determined. That is, the mobile device 140 can calculate the Adapter location error values for the adapter(s) that were previously encountered/used by the mobile device 140.

In operation, the mobile device 140 can be configured to calculate the Adapter location error value(s) based on one or more of the adapter wireless characteristics and one or more Adapter (i.e., adapter) weight factors. The Adapter weight factors can include, for example, an RSSI average delta weight value ($RSSI_{Adpweight}$), a signal strength average delta weight value ($Strength_{Adpweight}$), an RSSI bound weight value ($RSSI_{AdpBoundweight}$), and a signal strength bound weight value ($Strength_{AdpBoundweight}$). These weight values can be predetermined constant values, but are not limited thereto.

In an exemplary aspect, the Adapter location error value ($Adatper_{error}$) can be calculated based on the following Equation:

$$Adapter_{error} = (RSSI_{AvgDelta} \times RSSI_{AdpWeight}) + (Strength_{AvgDelta} \times Strength_{Adpweight}) + (RSSI_{BoundExceeded} \times RSSI_{AdpBoundweight}) + (Strength_{BoundExceeded} \times Strength_{AdpBoundweight})$$

where $RSSI_{AvgDelta}$ is an RSSI average delta value of a corresponding Adapter, $Strength_{AvgDelta}$ is a signal strength average delta value for the Adapter, $RSSI_{BoundExceeded}$ is a RSSI bound value for the Adapter, and $Strength_{BoundExceeded}$ is a signal strength bound value for the Adapter. $RSSI_{AdpWeight}$ is the RSSI average delta weight value for Adapters, $Strength_{AdpWeight}$ is the signal strength average delta weight value for Adapaters, $RSSI_{AdpBoundweight}$ is the RSSI bound weight value for Adapters, and $Strength_{AdpBoundweight}$ is the signal strength bound weight value for Adapters.

After step 514, the flowchart transitions to step 516, where an Adapter location score ($Adapter_{score}$) for the Adapter is calculated based on the Adapter location error value ($Adapter_{error}$) for the corresponding Adapter and one or more Adapter weight factors (e.g., $RSSI_{AdpWeight}$, $Strength_{AdpWeight}$, $RSSI_{AdpBoundweight}$, and/or $Strength_{AdpBoundweight}$). In an exemplary aspect, the processor circuitry 350 can be configured to calculate the Adapter location score ($Adapter_{score}$).

In an exemplary aspect, the Adapter location score ($Adapter_{score}$) can be calculated based on the following Equation:

$$Adapter_{score} = [(RSSI_{AdpWeight} + Strength_{AdpWeight} + RSSI_{AdpBoundweight} + Strength_{AdpBoundweight}) \times \alpha] - Adapter_{error}$$

where a is a predetermined constant (e.g., 100).

After step 516, the flowchart transitions to step 518, where a match score (MatchScore) can be calculated. In an exemplary aspect, the processor circuitry 350 can be configured to calculate the match score (MatchScore) based on the AP weight score ($WeightScore_{AP}$) and the Adapter location score ($Adapter_{score}$). In this example, the match score represents a score having AP and adapter contributions. In an exemplary aspect, the processor circuitry 350 can calculate the MatchScore for each matching AP In an exemplary aspect, the match score (MatchScore) can be calculated based on the following Equation:

$$Matchscore = Adatper_{score} + (WeightScore_{AP} \times \beta)$$

where $\beta$ is a predetermined match value (e.g., 0.7). In operation, the value of $\beta$ weights the AP weight score ($WeightScore_{AP}$) with respect to the Adapter location score ($Adapter_{score}$).

After step 518, the flowchart transitions to step 520, where the Match scores for each matching AP are compared to a match threshold value. If the match score is greater or equal to the match threshold value (Yes at step 520), the flowchart transitions to step 524. If the match score is less than the match threshold value (No at step 520), the flowchart transitions to step 522, where the AP corresponding to the match score is discarded. After the AP is discarded, step 520 can be repeated.

At step 524, the matched APs and corresponding location signatures are ranked based on the match scores. For example, the APs and corresponding location signatures can be ranked highest to lowest based on the match scores. In an exemplary aspect, the processor circuitry 350 can be configured to rank the matched APs and corresponding location signatures.

After step 524, the flowchart transitions to step 526, where the location of the mobile device 140 is identified based on the ranked location signatures. In an exemplary aspect, the processor circuitry 350 can select the AP and corresponding location signature having the highest match score (MatchScore).

After step 526, the flowchart transitions to step 528, where the Adapter associated with the location signature selected (e.g., the location signature corresponding to the highest match score). The mobile device 140 can then connect to the selected Adapter for subsequent wireless display casting to the Adapter. In this example, the mobile device 140 can connect to the Adapter and remain in a standby mode until a display casting is requested.

After step 528, the flowchart 500 transitions to step 530, where the flowchart 500 ends. The flowchart 500 may be repeated one or more times. In an exemplary aspect, the flowchart 500 is repeated when the mobile device 140 has moved to a new location to determine the available adapters at the new location.

Examples

Example 1 is a location estimation method, comprising: identifying one or more available access points (APs) and one or more available wireless display adapters; determining one or more wireless characteristics of the one or more available APs and one or more wireless characteristics of the one or more wireless display adapters; calculating one or more match scores based on the one or more wireless characteristics of the one or more available APs and the one or more wireless characteristics of the one or more available wireless display adapters; identifying a location signature based on the one or more match scores; and identifying a location based on the location signature.

Example 2 is the subject matter of Example 1, wherein the one or more wireless characteristics of the one or more available APs and the one or more wireless characteristics of the one or more available wireless display adapters comprise received signal strength indication (RSSI) values of the one or more available APs and the one or more available wireless display adapters, respectively.

Example 3 is the subject matter of Example 1, further comprising: calculating one or more AP location error values based on the one or more wireless characteristics of the corresponding one or more available APs; and calculating one or more AP location scores for the one or more available APs based on the corresponding one or more AP location error values.

Example 4 is the subject matter of Example 3, further comprising: calculating one or more adapter location error values based on the one or more wireless characteristics of the corresponding one or more available wireless display adapters; and calculating one or more adapter location scores for the one or more available wireless display adapters based on the corresponding one or more adapter location error values.

Example 5 is the subject matter of Example 4, wherein calculating the one or more match scores is based on the one or more adapter location scores and the one or more AP location scores.

Example 6 is the subject matter of Example 5, further comprising: ranking a plurality of location signatures based on the one or more match scores, the plurality of location signatures comprising the location signature.

Example 7 is the subject matter of Example 6, wherein determining the location signature is further based on the ranking of the plurality of location signatures.

Example 8 is the subject matter of Example 1, further comprising: automatically connecting to a wireless display adapter of the one or more available wireless display adapters based on the location signature.

Example 9 is the subject matter of Example 8, wherein the location signature identifies the wireless display adapter.

Example 10 is the subject matter of Example 8, wherein automatically connecting to the wireless display adapter comprises initiating the connection to the wireless display adapter in a standby display mode.

Example 11 is a communication device, comprising: a transceiver configured to communicate with one or more access points (APs) and one or more wireless display adapters; and a controller configured to: identify available APs of the one or more APs and available wireless display adapters of the one or more wireless display adapters; identify one or more wireless characteristics of the available APs and one or more wireless characteristics of the available wireless display adapters; calculate one or more match scores based on the one or more wireless characteristics of the available APs and the one or more wireless characteristics of the available wireless display adapters; identify a location signature based on the one or more match scores; and identify a location of the communication device based on the location signature.

Example 12 is the subject matter of Example 11, wherein the one or more wireless characteristics of the available APs and the one or more wireless characteristics of the available wireless display adapters comprise received signal strength indication (RSSI) values of the available APs and available wireless display adapters, respectively.

Example 13 is the subject matter of Example 11, wherein the controller is further configured to: calculate one or more AP location error values based on the one or more wireless characteristics of the corresponding available APs; and calculate AP location scores for the available APs based on the corresponding AP location error values.

Example 14 is the subject matter of Example 13, the communication device of claim 13, wherein the controller is further configured to: calculate one or more adapter location error values based on the one or more wireless characteris-tics of the corresponding available wireless display adapters; and calculate one or more adapter location scores for the available wireless display adapters based on the corresponding one or more adapter location error values.

Example 15 is the subject matter of Example 14, wherein calculating the one or more match scores is based on the one or more adapter location scores and the one or more AP location scores.

Example 16 is the subject matter of Example 15, wherein the controller is further configured to: rank a plurality of location signatures based on the one or more match scores, the plurality of location signatures comprising the location signature.

Example 17 is the subject matter of Example 16, wherein identifying the location signature is further based on the ranking of the plurality of location signatures.

Example 18 is the subject matter of Example 11, wherein the controller is further configured to: automatically connect to a wireless display adapter of the available wireless display adapters based on the location signature.

Example 19 is the subject matter of Example 18, wherein the location signature identifies the wireless display adapter.

Example 20 is the subject matter of Example 19, wherein automatically connecting to the wireless display adapter comprises initiating the connection to the wireless display adapter in a standby display mode.

Example 21 is a communication device, comprising: a transceiving means for communicating with one or more access points (APs) and one or more wireless display adapters; and a controlling means for: identifying available APs of the one or more APs and available wireless display adapters of the one or more wireless display adapters; identifying one or more wireless characteristics of the available APs and one or more wireless characteristics of the wireless display adapters; calculating one or more match scores based on the one or more wireless characteristics of the available APs and the one or more wireless characteristics of the available wireless display adapters; identifying a location signature based on the one or more match scores; and identifying a location of the communication device based on the location signature.

Example 22 is the subject matter of Example 21, wherein the controlling means is further configured for: automatically connecting to a wireless display adapter of the available wireless display adapters based on the location signature.

Example 23 is the subject matter of Example 22, wherein automatically connecting to the wireless display adapter comprises initiating the connection to the wireless display adapter in a standby display mode.

Example 24 is the subject matter of Example 21, wherein the controlling means is further configured for: calculating one or more AP location error values based on the one or more wireless characteristics of the corresponding available APs; and calculating one or more AP location scores for the available APs based on the corresponding one or more AP location error values.

Example 25 is the subject matter of Example 24, wherein the controlling means is further configured for: calculating one or more adapter location error values based on the one or more wireless characteristics of the corresponding available wireless display adapters; and calculating one or more adapter location scores for the available wireless display adapters based on the corresponding one or more adapter location error values.

Example 26 is the subject matter of Example 25, wherein calculating the one or more match scores is based on the one or more AP location scores and the one or more adapter location scores.

Example 27 is the subject matter of any of Examples 21-26, wherein the controlling means is further configured for ranking a plurality of location signatures based on the one or more match scores, the plurality of location signatures comprising the location signature.

Example 28 is the subject matter of Example 27, wherein determining the location signature is further based on the ranking of the plurality of location signatures.

Example 29 is the subject matter of any of Examples 21-28, the one or more wireless characteristics of the available APs and the one or more wireless characteristics of the available wireless display comprise received signal strength indication (RSSI) values of the available APs and available wireless display adapters, respectively.

Example 30 is an apparatus comprising means to perform the method as claimed in any of claims 1-10.

Example 31 is a machine-readable storage including machine-readable instructions, when executed, to implement a method or realize an apparatus as claimed in any of claims 1-10.

Example 32 is an apparatus substantially as shown and described.

Example 33 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to WLAN and wireless display protocols. The exemplary aspects can be applied to one or more cellular communication protocols/standards, including (but not limited to) 3rd Generation Partnership Project's (3GPP) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary aspects can be implemented in other kinds of wireless communication access networks, including (but not limited to) Bluetooth, Near-field Communication (NFC) (ISO/IEC 18092), ZigBee (IEEE 802.15.4), Z-Wave, and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A location estimation method to assist a communication device to establish a wireless display connection, comprising:
   identifying, by the communication device, one or more available access points (APs) and one or more available wireless display adapters;
   determining, by the communication device, one or more wireless characteristics of the one or more available APs and one or more wireless characteristics of the one or more available wireless display adapters;
   calculating, by the communication device, one or more match scores based on the one or more wireless characteristics of the one or more available APs and the one or more wireless characteristics of the one or more available wireless display adapters;
   identifying, by the communication device, a location signature based on the one or more match scores; and
   identifying, by the communication device, a location of the communication device based on the location signature.

2. The location estimation method of claim 1, wherein the one or more wireless characteristics of the one or more available APs and the one or more wireless characteristics of the one or more available wireless display adapters comprise received signal strength indication (RSSI) values of the available APs and the available wireless display adapters, respectively.

3. The location estimation method of claim 1, further comprising:
   calculating one or more AP location error values based on the one or more wireless characteristics of the corresponding one or more available APs; and
   calculating one or more AP location scores for the one or more available APs based on the corresponding one or more AP location error values.

4. The location estimation method of claim 3, further comprising:
   calculating one or more adapter location error values based on the one or more wireless characteristics of the corresponding one or more available wireless display adapters; and
   calculating one or more adapter location scores for the one or more available wireless display adapters based on the corresponding one or more adapter location error values.

5. The location estimation of claim 4, wherein calculating the one or more match scores is based on the one or more adapter location scores and the one or more AP location scores.

6. The location estimation method of claim 5, further comprising:
   ranking a plurality of location signatures based on the one or more match scores, the plurality of location signatures comprising the location signature.

7. The location estimation method of claim 6, wherein determining the location signature is further based on the ranking of the plurality of location signatures.

8. The location estimation method of claim 1, further comprising:
   automatically connecting, by the communication device, to a wireless display adapter of the one or more available wireless display adapters based on the location signature.

9. The location estimation method of claim 8, wherein location signature identifies the wireless display adapter.

10. The location estimation method of claim 8, wherein automatically connecting to the wireless display adapter comprises initiating the connection to the wireless display adapter in a standby display mode.

11. A communication device operable to establish a wireless display connection, comprising:
   a transceiver configured to communicate with one or more access points (APs) and one or more wireless display adapters; and
   a controller configured to:
      identify available APs of the one or more APs and available wireless display adapters of the one or more wireless display adapters;
      identify one or more wireless characteristics of the available APs and one or more wireless characteristics of the available wireless display adapters;
      calculate one or more match scores based on the one or more wireless characteristics of the available APs and the one or more wireless characteristics of the available wireless display adapters;
      identify a location signature based on the one or more match scores; and
      identify a location of the communication device based on the location signature.

12. The communication device of claim 11, wherein the one or more wireless characteristics of the available APs and the one or more wireless characteristics of the available wireless display adapters comprise received signal strength indication (RSSI) values of the available APs and available wireless display adapters, respectively.

13. The communication device of claim 11, wherein the controller is further configured to:
   calculate one or more AP location error values based on the one or more wireless characteristics of the corresponding available APs; and
   calculate one or more AP location scores for the available APs based on the corresponding one or more AP location error values.

14. The communication device of claim 13, wherein the controller is further configured to:
   calculate one or more adapter location error values based on the one or more wireless characteristics of the corresponding available wireless display adapters; and
   calculate one or more adapter location scores for the available wireless display adapters based on the corresponding one or more adapter location error values.

15. The communication device of claim 14, wherein calculating the one or more match scores is based on the one or more adapter location scores and the one or more AP location scores.

16. The communication device of claim 15, wherein the controller is further configured to:
   rank a plurality of location signatures based on the one or more match scores, the plurality of location signatures comprising the location signature.

17. The communication device of claim 16, wherein identifying the location signature is further based on the ranking of the plurality of location signatures.

18. The communication device of claim 11, wherein the controller is further configured to:
   automatically connect to a wireless display adapter of the available wireless display adapters based on the location signature.

19. The communication device of claim 18, wherein the location signature identifies the wireless display adapter.

20. The communication device of claim 19, wherein automatically connecting to the wireless display adapter comprises initiating the connection to the wireless display adapter in a standby display mode.

21. A communication device operable to establish a wireless display connection, comprising:
   a transceiving means for communicating with one or more access points (APs) and one or more wireless display adapters; and
   a controlling means for:
      identifying available APs of the one or more APs and available wireless display adapters of the one or more wireless display adapters;
      identifying one or more wireless characteristics of the available APs and one or more wireless characteristics of the wireless display adapters;
      calculating one or more match scores based on the one or more wireless characteristics of the available APs and the one or more wireless characteristics of the available wireless display adapters;
      identifying a location signature based on the one or more match scores; and
      identifying a location of the communication device based on the location signature.

22. The communication device of claim 21, wherein the controlling means is further configured for:
   automatically connecting to a wireless display adapter of the available wireless display adapters based on the location signature.

23. The communication device of claim 22, wherein automatically connecting to the wireless display adapter comprises initiating the connection to the wireless display adapter in a standby display mode.

* * * * *